(12) United States Patent
Eleftheriou et al.

(10) Patent No.: US 8,862,815 B2
(45) Date of Patent: Oct. 14, 2014

(54) READING FILES STORED ON A STORAGE SYSTEM

(71) Applicant: International Business Machines Corporation, Armonk, NY (US)

(72) Inventors: Evangelos S. Eleftheriou, Rueschilikon (CH); Robert Haas, Rueschilikon (CH); Nils Haustein, Mainz (DE); Jens Jelitto, Rueschlikon (CH); Ioannis Koltsidas, Rueschlikon (CH); Slavisa Sarafijanovic, Rueschlikon (CH); Alexander Saupp, Mainz (DE); Harald Seipp, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 13/679,588

(22) Filed: Nov. 16, 2012

(65) Prior Publication Data
US 2013/0132663 A1 May 23, 2013

(30) Foreign Application Priority Data
Nov. 18, 2011 (EP) ..................................... 11189769

(51) Int. Cl.
*G06F 12/08* (2006.01)
(52) U.S. Cl.
CPC ...... *G06F 12/0866* (2013.01); *G06F 2212/224* (2013.01); *G06F 2212/463* (2013.01); *G06F 2212/213* (2013.01)

USPC ......................................................... 711/113
(58) Field of Classification Search
CPC .................................................. G06F 12/0866
See application file for complete search history.

(56) References Cited

U.S. PATENT DOCUMENTS 5,829,046 A 10/1998 Tzelnic et al.
6,711,580 B2 3/2004 Dahman et al.
(Continued)

OTHER PUBLICATIONS

"Implementing an Automated Digital Video Archive Based on the Video EDITI8ON of Xendata Software," XenData White Paper, Apr. 2007, Implementing a Digital Video Archive Broadcast History.

(Continued)

*Primary Examiner* — Hiep Nguyen
(74) *Attorney, Agent, or Firm* — Jon A. Gibbons; Fleit Gibbons Gutman Bongini & Bianco PL

(57) ABSTRACT

A system and method for reading files stored on a storage system is disclosed. The method includes communicatively coupling one or more remote systems for reading files stored in storage with a first set of files according to a predetermined data format and in a cache memory with a second set of files, the second set of files being a subset of the first set of files. Next one or more remote systems are received at least one read request for reading a sequence of files. A determination is made, among the files of the sequence of files, whether one or more cached files are already stored in the cache memory and whether one or more remaining files are not already stored in the cache memory. Creating, within the one or more remaining files, an order according to which the remaining files should be read on the storage system.

20 Claims, 3 Drawing Sheets

(56) References Cited

U.S. PATENT DOCUMENTS

| | | | |
|---|---|---|---|
| 6,772,305 B2* | 8/2004 | Gold | 711/162 |
| 7,577,786 B2* | 8/2009 | Matlock, Jr. | 711/111 |
| 7,644,204 B2 | 1/2010 | Marripudi et al. | |
| 7,864,479 B2 | 1/2011 | Ashton et al. | |
| 7,962,385 B2* | 6/2011 | Falk et al. | 705/35 |
| 8,103,623 B2* | 1/2012 | Lou | 707/609 |
| 8,713,283 B2* | 4/2014 | Sinclair | 711/202 |
| 2002/0032671 A1* | 3/2002 | Iinuma | 707/1 |
| 2008/0040539 A1 | 2/2008 | Haustein et al. | |
| 2010/0211731 A1 | 8/2010 | Mittendorff et al. | |

OTHER PUBLICATIONS

SGI Copan Virtual Tape Library—300T/TX; http:/www.sgi.com/pdfs/4207.pdf.

Laura Du Bois, "Driving to Best Practices in Archiving," White Paper, Sponsored by Plasmon, Mar. 2007, IDC Analyze the Future.

Dennis Colarelli, et al., "The Case for Massive Arrays of Idle Disks (MAID)," Department of Computer Science, University of Colorado, Boulder, Jan. 7, 2002.

David J. Cuddihy, "Optimizing Virtual Tape Performance: Improving Efficiency With Disk Storage Systems," ATTO Technology Incorporation, Embedded Software Group, June 2007.

* cited by examiner

| File 1 | File 2 | File 3 | File 4 | File 5 |
|---|---|---|---|---|

| File 1 | File 2 | File 3 | File 4 | File 5 | File 1' | File 2' |
|---|---|---|---|---|---|---|

| File 1 | File 2 | File 3 | File 4 | File 5 | File 1' | File 2' | ........ | File 3' |
|---|---|---|---|---|---|---|---|---|

READING FILES STORED ON A STORAGE SYSTEM

CROSS-REFERENCE TO RELATED APPLICATIONS

This application is based upon and claims priority from prior European Patent Application No. 11189769.0, filed on Nov. 18, 2011 the entire disclosure of which is herein incorporated by reference.

FIELD OF THE INVENTION

The invention relates to the field of cache architecture for storage system, and specifically to a method for reading files on a storage system.

BACKGROUND

Despite the significant progress of HDD (hard disk drive) technology over the past years, magnetic tape systems constitute an integral part of current tiered storage infrastructures. Tape technology offers several important advantages including low-cost, long-term storage of data as well as for backup and disaster recovery purposes, energy savings, security, lifetime, and reliability.

Once data has been recorded in tape systems, the medium is passive. This means that it simply sits in a rack and no power is needed. Compared with similar disk-based systems, a tape-based archive consumes approximately 290 times less power. In terms of security, once data has been recorded and the cartridge removed from the access system, the data is inaccessible until the cartridge is reinstalled in the active system. Security is further enhanced by drive-level encryption, which was introduced in Linear Tape Open generation-4 drives (LTO-4) and is also standard in enterprise-level tape drives. The tape medium has a lifetime of 30+ years; however, this is rarely taken advantage of because of the rapid advances in tape hardware and the cost savings associated with migration to higher-capacity cartridges. In terms of reliability, LTO-4 tape has a bit error rate that is at least an order of magnitude better than that of a SAS (Serial Attached SCSI) HDD. Moreover, the fact that tape media is removable and interchangeable, means that, in contrast to HDDs, mechanical failure of a tape drive does not lead to data loss because a cartridge can simply be mounted in another drive.

All of the above advantages contribute to the major net advantages of tape system, which are cost and reliability. Estimates of cost savings between disk and tape range from a factor of three to more than 20.

Hard disks provide random access to data and generally contain a file index managed by a file system. These files can be accessed by means of standard sets of application programming interfaces (APIs) using various operating systems and applications. Tape, in contrast, is written in a linear sequential fashion typically using a technique called "shingling" which provides backward write compatibility, but also implies that new data can only be appended at the end and that previously written areas can only be reclaimed if the entire cartridge is reclaimed and rewritten. In traditional tape systems, an index of the files written on a given cartridge is usually only kept in an external database managed by an application such as a proprietary back-up application. The need to access an external database to retrieve data renders data on tape much less portable and accessible than with alternative storage methods, such as a HDD or a USB (Universal Serial Bus) drive.

To address these deficiencies, a new file system, referred to as Linear Tape File System (LTFS), has recently been introduced in the LTO-5 tape-drive systems to enable efficient access to tape using standard and familiar system tools and interfaces. LTFS is implemented by taking advantage of the dual-partition capabilities supported in the new LTO-5 format. A so-called index partition is used for writing the index, and the second, much larger partition for the data itself. The index partition is used for the directory of the file system, whereas the data partition is used to store the actual user's files in the file system. Placing the index on a separate partition is advantageous because it can be rewritten without impacting the actual data. LTFS exposes a POSIX-like file system interface to the user, manages the file system index in the index partition and stores the data in the data partition. The file system represented by the LTFS software makes files and directories show up on the desktop with a directory listing while the files are actually located on tape. File system users can "drag and drop" files to and from tape and can run applications developed for disk systems. In library mode, the content of all volumes in the library can be listed and searched without mounting the individual cartridges. All these features help reduce tape, file management and archive costs and eliminate the dependency on a middleware layer. Hence the cost per gigabyte (GB) stored is reduced. In addition, tape becomes cross-platform-portable (LTFS is available on Linux®, Apple Mac OS X®, Microsoft Windows®), enabling and facilitating the sharing of data between platforms. These features enable significant new use cases for tape, such as video archives, medical images, etc. Considering the cost advantages of tape over other storage solutions, the demonstrated potential for the continued scaling of tape-cartridge capacity and cost per GB as well as the increasing usability of tape provided by advances such as the LTFS, tape appears set to play an important role in the exploding market for archival data storage solutions.

However, even with LTFS, files are stored in a sequential manner on tape which causes non-negligible longer access times during I/O operations such as read and write.

The documents 'Implementing an Automated Digital Video Archive based on the video edition of Xendata Software', XenData White Paper, April 2007, US 2008/0040539 A1, US2010/0211731 A1, U.S. Pat. No. 7,864,479 B2, U.S. Pat. No. 5,829,046, U.S. Pat. No. 7,644,204 B2, U.S. Pat. No. 6,711,580 B2, 'SW) COPANTM Virtual Tape Library—300T/TX', 'Driving to best practices in archiving', L. DuBois, March 2007, Page 6, 'The case for massive arrays of idle disks', D. Colarelli, D. Grunwald and M. Neufeld, Dept. of Computer Science, Univ. of Colorado, Boulder, Jan. 7, 2002, Page 3, 'Optimizing virtual tape performance: improving efficiency with disk storage system', D. Cuddihy, Atto Technology Incorporation, Embedded Software Group, June, 2007, Page 6, are related to the field of the invention.

BRIEF SUMMARY OF THE INVENTION

According to a first aspect, the invention is embodied as a method for reading files stored on a storage system, wherein the storage system comprises storage means storing a first set of files according to a predetermined data format and cache memory storing a second set of files, the second set of files being a subset of the first set of files, the storage system being configured to allow one or more remote systems for reading files stored on the storage means and/or on the cache memory, the method comprises:

receiving from one or more remote systems at least one read request for reading a sequence of files;

determining, among the files of the sequence, whether one or more cached files are already stored on the cache memory and whether one or more remaining files are not already stored on the cache memory;

determining, within said one or more remaining files, an order according to which said remaining files should be read on the storage system, given locations of said remaining files as stored on the storage system according to said predetermined data format;

reading said one or more remaining files on the storage system according to said order and storing the remaining files on the cache memory.

In embodiments, the method may comprise one or more of the following features:

the storage system comprises a non-volatile memory which is used as the cache memory;

the non-volatile memory which is used as the cache memory comprises an array of hard disk and/or solid state drives;

the array of hard disk and/or solid state drives is organized into a single logical address space;

the cache memory is a file-level cache memory;

the cache memory is a block-level cache memory.

the storage means comprises at least one magnetic tape medium storing the first set of files according to Linear Tape File System data format, and wherein the locations of said remaining files as stored on the storage system is determined according to a starting block for each remaining file as part of the metadata of the Linear Tape File System data format;

the cache memory comprises a first region that is managed using a First In First Out policy management and a second region managed that is managed using a Least Recently Used policy management, the first and second regions being adapted to store said second set of files according to a set of rules for cache capacity management;

the set of rules comprises at least the following rules:
i) if the first region is full, then the oldest files of the second set are copied to the storage means and evicted from the first region;
ii) if the first region is full and the second region has free capacity, then the first region gains a given percentage of the free capacity of the second region;
iii) if the second region is full, then the files of the second set with the least number of access and the oldest last-access time are copied to the storage means and evicted from the second region;
iv) if the second region is full and the first region has free capacity, then the second region gains a given percentage of the free capacity of the first region.

According to another aspect, the invention is embodied as a computer program, stored on a computer readable medium, for reading files stored on a storage system, comprising code means for causing a computer to take the steps of the method according to the invention.

In embodiments, the computer program may comprise one or more of the following features:

code means for managing the storage means as Linear Tape File System and wherein the storage means comprises a standalone tape library having at least one magnetic tape medium managed using the Linear Tape File System;

the computer program is a user-space program component.

According to another aspect, the invention is embodied as a storage system comprising:

storage means storing a first set of files according to a predetermined data format;

cache memory storing a second set of files, the second set of files being a subset of the first set of files;

at least one interface for receiving from one or more remote systems read and write requests a processing unit for executing the instructions of the computer program according to the invention.

BRIEF DESCRIPTION OF THE DRAWINGS

A process and a process embodying the invention will now be described, by way of non-limiting example, and in reference to the accompanying drawings, where.

DETAILED DESCRIPTION OF THE EMBODIMENTS

Figures 1, 5A, 5B, 5C:
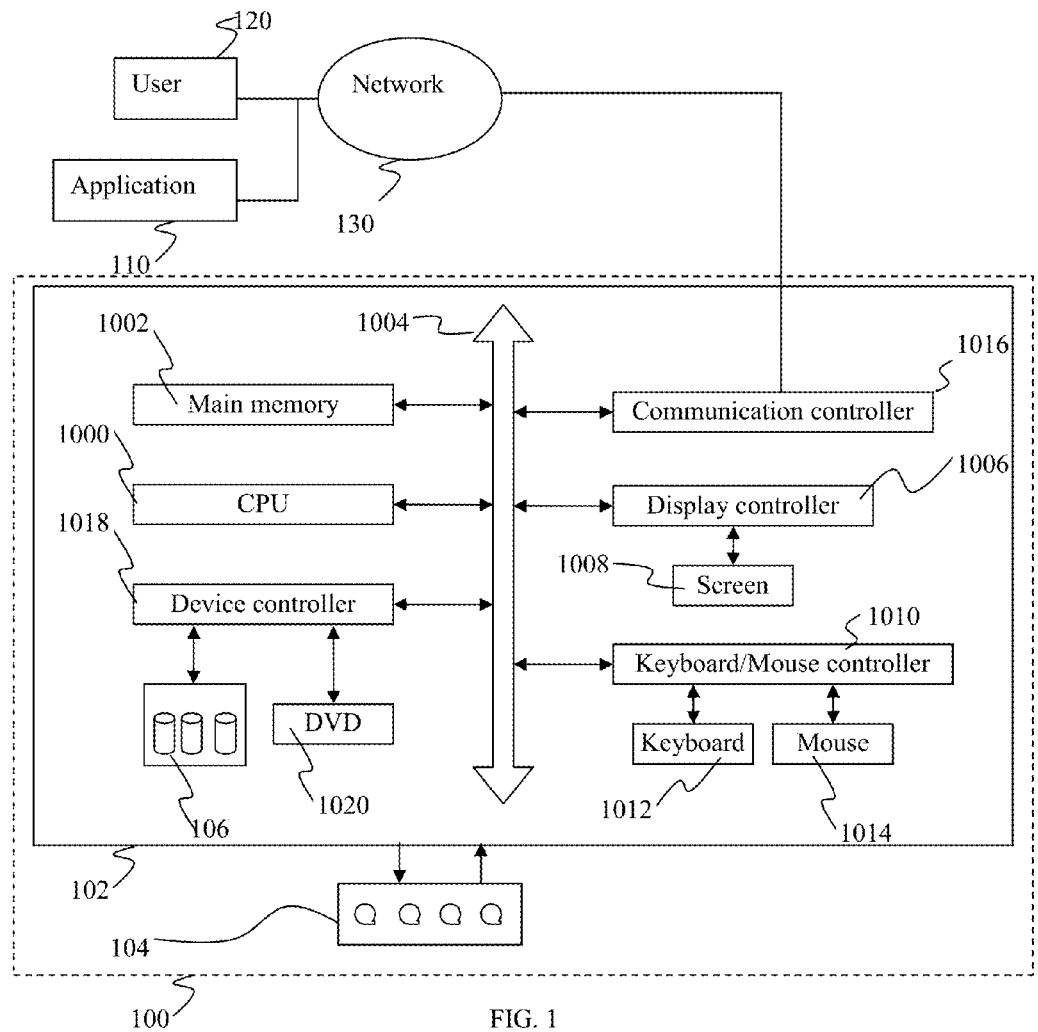
FIG. 1 is an example of an architecture view of a storage system remotely accessed by other systems according to the invention.
FIG. 5a-5c is an example of locations of remaining files as stored on the storage system according to predetermined data format.

The invention describes a method for reading files stored on a storage system. A storage system refers to computer components and recording media that retain digital data. The storage system comprises storage means storing a first set of files according to a predetermined data format. A data format refers to a format for encoding data for storage on a storage medium in a computer file system. The storage system also comprises a cache memory storing a second set of files, the second set of files being a subset of the first set of files. The cache memory is a component that stores data so that future requests for that data can be served faster. The storage system is configured to allow one or more remote systems for reading files stored on the storage means and/or on the cache memory. A remote system generally refers to any system or application located at a remote location for the storage system. The method for reading files stored on a storage system comprises receiving from one or more remote systems at least one read request for reading a sequence of files. A sequence of files refers to a well-ordered, finite collection of files, usually related to each other in some way. The method comprises determining, among the files of the sequence, whether one or more cached files are already stored on the cache memory and whether one or more remaining files are not already stored on the cache memory. The method comprises determining, within said one or more remaining files, an order according to which said remaining files should be read on the storage system, given locations of said remaining files as stored on the storage system according to said predetermined data format. The location of files on the storage system refers to the organisation or position of the files the storage system. The positioning of the files may be carried out by physically or virtually dividing the data space. The method comprises reading said one or more remaining files on the storage system according to said order and storing the remaining files on the cache memory.

Thus, the focus of the proposed invention is on techniques that improve performance of a storage system such as a tape storage system (e.g. a tape storage system based on LTFS), not only in terms of access latency, but also in terms of throughput and space utilization. To that end, the storage system uses storage means in concert with a cache memory which is used as a caching layer above the storage means. The storage system reads the requested files with an optimized read allowing a cache pre-fetching of files. Thus, the method according to the invention provides not only a faster access to the most recently and or frequently cached files, but also is designed to speed up use cases such as backup or restore and migration operations of files stored on storage means.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is an architecture view of a storage system 100 remotely accessed by other systems 110, 120 according to an embodiment of the invention. The storage system may also be referred to as a tape appliance system. The storage system 100 according to an embodiment of the invention includes at least one Computer Processing Unit (CPU) 1000 or processor and a main memory 1002, typically Dynamic Random Access Memory (DRAM). The CPU and DRAM are connected to a bus 1004. The bus may be connected to a display controller 1006 which is connected to a display such as an LCD monitor 1008. The display may be used to display information about the storage system 100. The bus may further be connected to a keyboard 1012 and a mouse 1014 through a keyboard/mouse controller or a USB controller 1010. The bus may also be connected to a communication controller 1014 conforms to, for example, an Ethernet (registered trademark) protocol. The communication controller is used to physically connect the computer system with a network, for instance the network 130. The bus is also connected to a storage device such hard disk 104 or DVD 1020 through a device controller 1018 such as an IDE or SATA or SCSI controller.

The storage system 100 further comprises storage means 104 storing a first set of files according to a predetermined data format. For instance, the storage means may be a sequential-access media such as a standalone tape drive (or tape library), that can support a multitude of tape drives or heads. The standalone tape drive is used to operate on linear tape, on one or more tape cartridges. The predetermined data format of the data stored on the tape drive may use a LTFS format data-format that holds the file content data and associated file metadata. Thus, the data stored on the tape drive and written using LTFS format can be exchanged with others systems 110, 120 able to understand LTFS format.

The storage system 100 further comprises a cache memory storing a second set of files, the second set of files being a subset of the first set of files. The cache memory optimizes performances of the storage system, exploiting temporal and spatial locality of workloads. The cache memory is a read cache. Optionally, the cache memory may also be a write cache. The read cache improves performance by transparently storing data such that future requests for that data can be served faster. If requested data is contained in the cache, that is, if a cache hit occurs, this request can be served by simply reading the cache, which is comparably faster than reading from the backend storage device. Otherwise a cache miss occurs and the data has to be fetched from the slower backend storage device.

In practice, the storage system comprises a non-volatile memory which is used as the cache memory. Advantageously, the non-volatile memory allows to retain the files stored thereon when the storage system is turned off. The non-volatile memory which is used as the cache memory may comprise an array of hard disk drives or solid state drives. The array of large-capacity HDDs and/or SSDs may be configured in a RAID (Redundant Array of Independent Disks) scheme. The cache memory controller may expose a single logical volume to the operating system of the server, thus making easier the management of the cache memory. Also, a conventional disk file system such as, but not limited to, ext3, ext4 or NTFS, is installed on that logical volume and is used for all I/O operations to the disk array. The cache memory, that is, the whole disk array, is dedicated to caching and is not shared with other components of the system.

The cache memory may be a file-level cache memory. Alternatively, the cache memory may be a block-level cache memory. In this case, HDDs and/or SSDs of the array are used as raw device, with no file system, and then volumes are created and an operating system connects to these volumes and uses them as individual hard drives. Block level cache memory is usable for almost any kind of application, including file storage, database storage, virtual machine file system (VMFS) volumes, and more.

Typically, the storage system comprises a server 102 which comprises the CPU and DRAM, the bus, the display controller, the communication controller. The server 102 is attached to the storage means 104 that may run an LTFS software, and expose the underlying tape capacity via a standard file system interface. The server 102 is further directly attached to the cache memory 106. The server runs an operating system such as, but not limited to, the Linux (trademark) operating system. The server is connected to the network 130 and thereby remote network users 120 and applications 130 can mount storage means (e.g. LTFS file system) and directly store or retrieve data from the storage means.

Hence, the storage system comprises one or more storage devices (e.g., HDDs/SSDs array) used as a cache memory that may be logically configured into a single logical address space and storage means that may comprise one or more tape drives operating in parallel, as shown in FIG. 1. The storage system further comprises one or more storage devices such as magnetic tape medium. The tape library is typically managed using an LTFS file system. It is to be understood that another file system may be used. The LTFS file system runs in the server 102, to which both the tape library and the HDD array are directly attached. The cache memory is used as a cache for the LTFS file system, providing advantageously fast random access to the data stored on the storage means.

Figure 6:
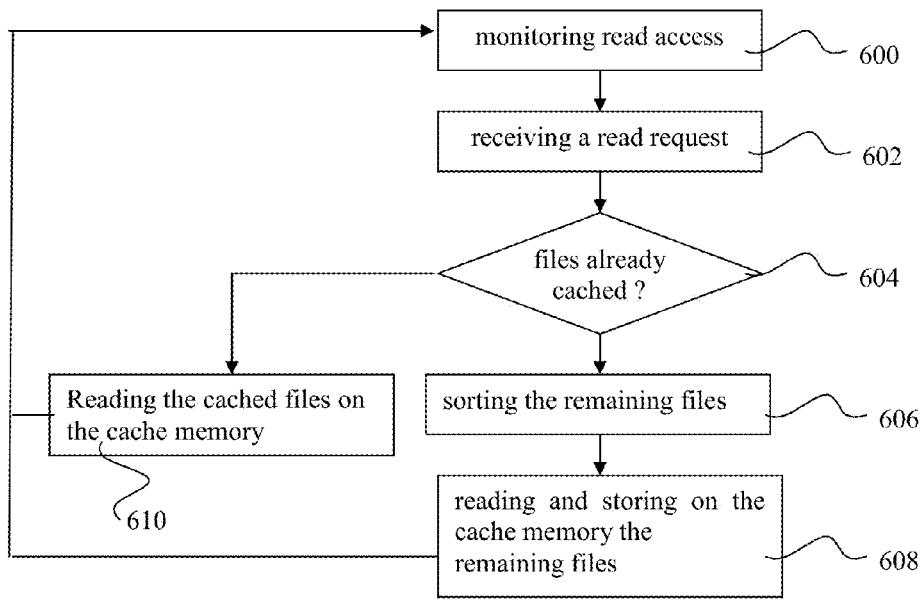
FIG. 6 is an example of a flowchart describing an embodiment of the invention.

Referring now to FIG. 6, a flowchart describing an embodiment of the invention is now depicted.

At steps 600-602, it is monitored whether the storage system receives at least one read request for reading a sequence of files from one or more remote systems. In other words, a decision is made whether the read request matches a certain pattern. The pattern might be denoted by files being read sequentially from a directory. As shown on FIGS. 1-3, the remote systems may be an application. The request is received by the storage system through its communication controller and appropriate interfaces 23, 24, 25, 26, 27.

At step 604, it is determined, among the files of the sequence of files, whether one or more cached files are already stored on the cache memory and whether one or more remaining files are not already stored on the cache memory. In other words, it is determined which files among the requested files are located on the cache and on the storages means. This amounts to say that the names of all files, which have been matched before, are determined; otherwise said, the files stored on the cache memory.

Next, at step 610, the files stored on the cache memory are read. This provides faster access to the most recently/frequently cached files.

Then, at step 606, it is determined, within the one or more remaining files, an order according to which the remaining files should be read on the storage system. Thus, a ranking of the requested files of the sequence of files stored on the storage means is carried out. Otherwise said, the files are arranged in some sequence. The ordering of these files is performed given the locations of remaining files as stored on the storage system according to their predetermined data format.

It is to be understood that the steps 610 and 606 may be carried out at the same time.

In a sequential-access media such as a standalone tape drive managed by LTFS, the ordering of the files according to their location on tape is enabled by the LTFS format which includes a starting block for each file as part of the LTFS metadata, available to the user through a virtual extended attribute.

Referring now to FIGS. 5a-5c, it is shown an example of locations of files as stored on a storage system according to predetermined data format. Especially, FIGS. 5a-5c show files arranged in a sequential-access media such as a standalone tape drive (or tape library) managed by LTFS.

The storage system obtains read and write commands from one or more remote systems. A remote system may conduct a read for all files which are stored on a directory or on a subdirectory. However, these files might not be arranged sequentially on the tape because some files might have been changed over time and may reside in subsequent locations. Files that get modified or overwritten on an LTFS cartridge are appended on tape, rather than be modified in place. The situation described above is shown in FIGS. 5a-5c.

FIG. 5a shows the positions of the file pertaining to one directory on a tape. Because the files have been backed up in sequence the file are arranged sequentially on tape.

FIG. 5b shows that file1 and file2 have been changed and are therefore written to the end of tape. Filet is now called file1' and file2 is now called file2'.

FIG. 5c shows that file3 has been changed and prior to its backup other files have been backed up. Changed file 3 is called file3'. FIG. 5c makes clear that a restore of most current versions of file1-file5 would require the tape to be moved back and forth multiple times because file 3' is at the end of tape and file1' and file2' are located between file1-file5 and file 3'. File' and file2' are thus somewhere in the middle while file4 and file5 are toward the beginning of tape.

In FIG. 5c, the files can be ordered according to their location or position on the tape managed by LTFS: files file4 and file5 which are toward the beginning of tape, followed by files file1' and file2' which are in the middle of the tape, and finally, file file3' which is located at the end of the tape.

Referring back to FIG. 6, at step 608, one or more remaining files on the storage system are read in accordance with the ordering step 606. The remaining files are also stored on the cache memory, that is, the files are copied from the storage means to the cache memory. Optionally, the file files may be copied on the storage means in the same order as they are read. It is to be understood that the reading and the copy of the files stored on the storage means may be carried out concomitantly.

Alternatively, at step 608, the remaining files are first stored on the cache memory in accordance with the ordering step 606, and then read from the cache memory. In this case, the reading may also be done in accordance with the ordering step.

Thus, the method according to the invention provides a pre-fetching of files stored on the storage means to the cache memory, thus allowing to speed up common tape-specific use cases such as backup/restore and migration. Indeed, these operations of backup/restore and migration require reading a sequence of files which are stored on the cache memory in accordance with the invention. Typically, the pre-fetching of the files stored on the storage means to the cache memory may apply to all the files stored in a directory (or sub-directory) of the storage means. Hence, the method of the invention allows to pre-fetch all the files stored in the directory to the cache memory.

It is to be understood that the method according to the invention not only applies for all files which are stored in one directory. It can apply for any scenario where multiple files are read the storage means, regardless of the files are stored on a single storage device of the storage means. For example, an LTFS storage may comprises one tape or on multiple tapes. In this case, the files of the sequence of files are ordered according to the tape on which they are stored and according to their location on this tape. As a result, files are read on each tape in a sorted order, and tapes are read in a sorted order.

Figure 2:
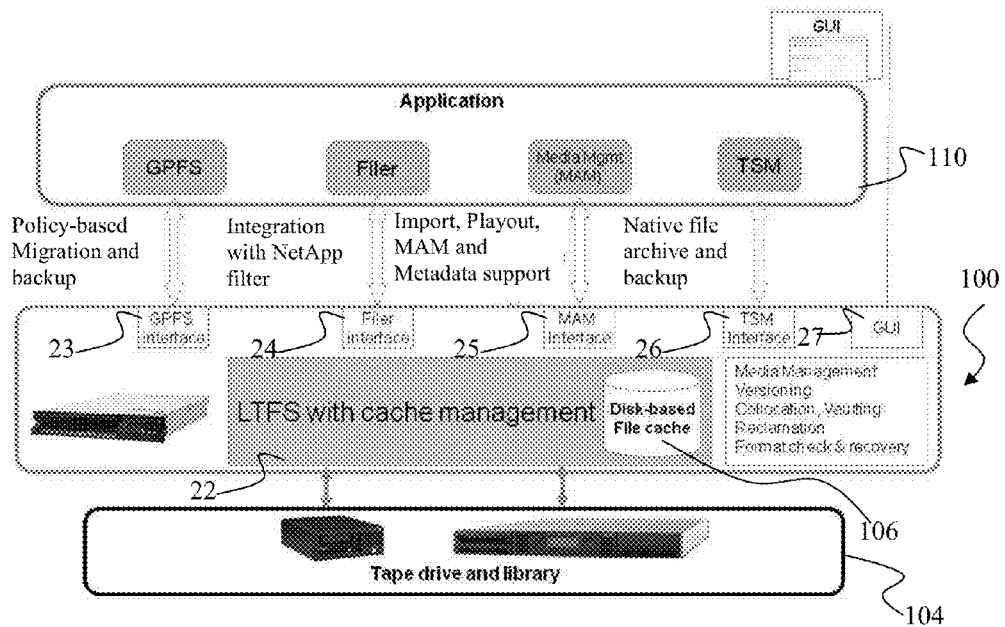
FIG. 2 is an example of data path view of the storage system depicted on FIG. 1.

Referring now to FIG. 2, an example of data path view between a remote system such as an application or a client and the storage system depicted on FIG. 1 is shown. The storage system 100 is remotely accessed by systems such as an application 110 or a client 120, e.g. via a network. Other systems might be a file system server such as GPFS (General Parallel File System) cluster or NAS (Network-attached storage) filer.

Remote systems may access the storage system either by mounting it using a network file system or by reading from and writing data to it using the FTP (File Transfer Protocol) protocol or the SSH (Secure SHell) protocol. It is to be understood that any other protocol may be used for remotely accessing the storage system 100.

The storage system 100 provides appropriate interfaces 23, 24, 25, 26, 27, as shown in FIG. 2, so that the storage system can be used to accommodate storage needs for a multitude of applications 110. In FIG. 2, the storage system comprises a multitude of tape drives as storage means managed using LTFS software 22. The following are examples of applications for managing files stored on the tape drives, including but not limited to:

1) Backup of a GPFS (or other) file system connected to the storage system over the network. The entire GPFS file system or individual directories or file sets can be backed up into the storage system. Full or incremental backups can be taken and multiple versions can be supported on the same or different tape cartridges. Additionally, multiple backups originating from the same or different file systems/clusters can be supported in the same appliance. Advantageously, LTFS enables the backup to be self-contained and self-describing on the tape cartridge, saving the user from the need to deploy and maintain a TSM server. In addition, the file attributes of GPFS can be preserved on LTFS, and also enforced with some modifications to LTFS. The backup process, which can be orchestrated either by a GPFS node or by the tape appliance itself, is outlined in the following steps:

a. A GPFS policy running in the cluster identifies the files that have changed since the last backup;

b. The policy invokes an external process to perform the backup;

c. The backup-process copies files to the appliance preserving the GPFS file attributes;

d. The copy operation may be done over SSH or using an NFS/CIFS mount;

e. When the process finishes, the tape cartridge may be removed and be put into a vault or be moved to any other system.

Files can be restored from the backup by just reading the tape, in the same or any other tape system, and leveraging the file system interface provided by LTFS, which allows to keep the same name-space as in GPFS. This means any file which has been backed up from the filer can have the name (path and file) in LTFS which allows easy recovery.

2) Migration of files from a GPFS (or other) file system, i.e., using the tape storage as a tier in the storage hierarchy. The user specifies migration criteria for files or directories in the form of user-specified GPFS policies and the system seamlessly places the data on tape by migrating files that meet the aforementioned specified criteria, to the tape appliance. For each file migrating to the tape appliance, the file is replaced in GPFS by a file stub (a placeholder). Thereby, the files remain in the GPFS namespace and can be accessed as normal files by the users and the existing applications. Upon access to a migrated file, the file is recalled from the tape appliance.

3) Integration with NAS filers (e.g., NetApp filers) to copy old snapshots from the filer to LTFS and delete older snapshots from the filer. The advantage is that older snapshots, which typically require more storage capacity, are stored on LTFS can seamlessly be accessed through the LTFS file system interface which is can be a NAS interface such as NFS or CIFS provided by the NAS filer as well.

4) In Media Management (MAM), the medium often contains multiple versions of the same data stream. A common practice is to have a high definition version of an audio-video stream together with a so-called "proxy" which is a low-resolution version of the same content. It would be very beneficial to cache the files pertaining to the proxy as this is being used more frequently to edit/cut the content to produce a cut list that would be later on applied to the hi-def original stream to produce a playout stream or for direct playout.

5) Graphical User Interface for remotely managing the storage system, including, but not limited to, media management, versioning, vaulting, format check and recovery of the stored files.

The method for reading files stored on a storage system according to the invention may be implemented on as a computer program running on the server 102 and executed by the server. In practice, the method is implemented with the code part adapted to manage the storage means. For instance, and in reference to FIG. 2, the method may be implemented inside the LTFS code of the LTFS software adapted to manage the tape drives 104.

Alternatively, the method may be implemented outside the server 102, as an external module. Thereby a given file system of the storage means 104 can be replaced with any other tape file system in the future. It is to be understood that such an external module needs to interface with both the OS of the storage system and the file system of the storage means.

Preferably, the computer program implementing the method according to the invention is a user-space program component. Advantageously, this allows to improve the portability as a user-space software component (as opposed to a kernel-space one) allows for a low implementation complexity.

Figure 3:
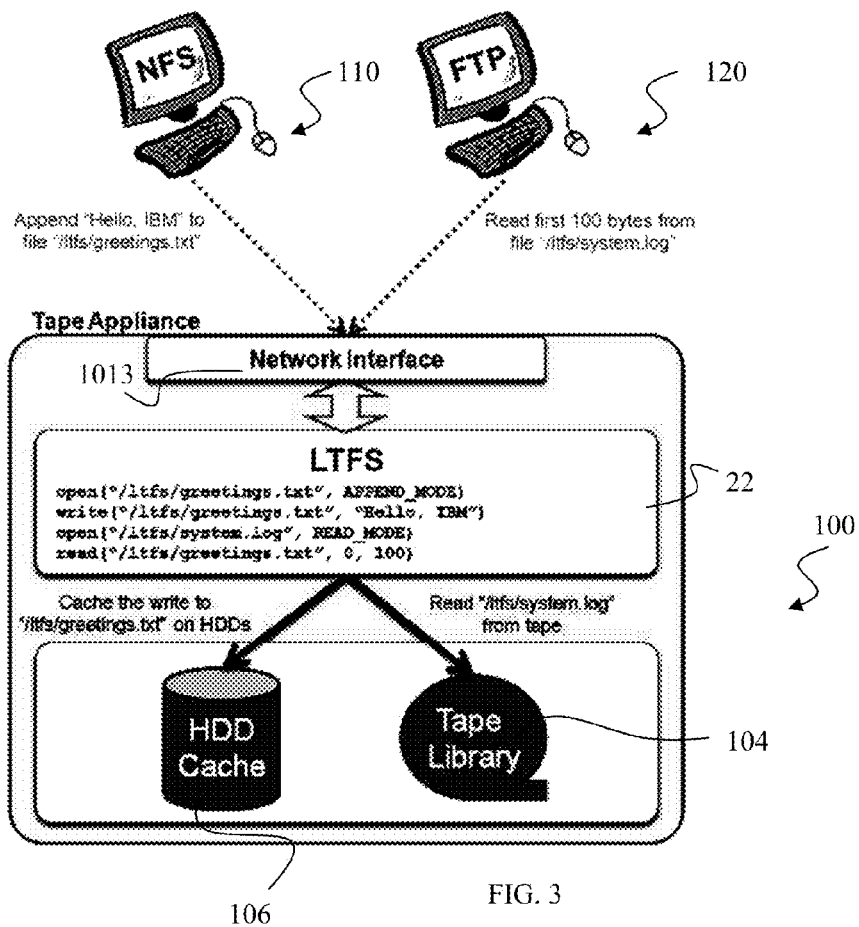
FIG. 3 is another example of data path view of the storage system depicted on FIG. 1.

Referring now to FIG. 3, another example of data path view of the storage system depicted on FIG. 1 is shown. The storage system 100 comprises a network interface, e.g. the communication controller 1016 in FIG. 1. In FIG. 3, all I/O operations to the storage system are realized as LTFS file system operations. For instance, a client write to the storage system will always end up to be a write operation to an LTFS file starting at a specific offset and with a specific length in bytes, as illustrated on FIG. 3. In a first scenario, a remote user 110, issues a write to file "/ltfs/greetings.txt" using an NFS mount to the storage system. The write is passed to LTFS 22 by the server (not shown). Then LTFS finds this file to be already cached in the HDD cache 106 and the write is absorbed on the HDD, with "/ltfs/greetings.txt" being an ext3 file on the HDD file system. In a different scenario, another remote user 120 wants to read some bytes from a file on the storage system using the FTP protocol. The user issues an FTP get request, which the appliance server translates into an LTFS read request. LTFS looks up the requested file in the cache, but does not find it to be there. Therefore, LTFS reads the requested file from the tape library and returns the first 100 bytes to the user. At that point, LTFS may choose to cache the file on the HDDs or not.

Figure 4:
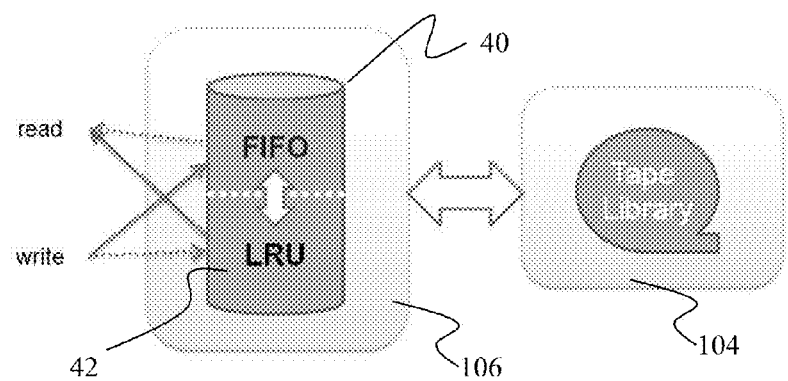
FIG. 4 is an example of the caching of the storage system depicted on FIGS. 1-3.

Referring now to FIG. 4, an example of the cache memory of the storage system depicted on FIG. 1 is now discussed. The cache memory is typically a non-volatile storage, and therefore, the cache memory may safely hold both modified and unmodified data on a file level.

Typically, the cache memory 106 is divided into first 40 and second 42 regions or spaces. The first and second regions are adapted to store files originally stored in the storage means. The storage of files in the first and second regions is performed in accordance with a set of rules for cache capacity management.

In practice, the first region is a FIFO (First In First Out) region 40, and the second region is an LRU (Least Recently Used) region 42. This amounts to say that the cache memory is divided into a FIFO cache and a LRU cache. The FIFO region is managed using a First-In-First-Out replacement policy, while the LRU region is managed using a Least-Recently-Used policy. The FIFO region is typically destined to hold files that will only be accessed at most once after they are written to the cache. This is for instance the case of a backup write-verification process. The LRU region is typically destined to cache files that have a high probability of multiple accesses in the near future.

As shown in FIG. 4, user writes will usually write their data to the FIFO cache, while user reads will usually be served by the LRU cache. However, this is not a requirement: indeed, incoming data may also be written to the LRU cache if the user hints that the data will be accessed multiple times in the near future. On the other hand, user reads may be served from the FIFO cache if the requested data is found to be there.

Optionally, at the same time, files are moved between the two regions of the cache depending on their workload: indeed, the cache memory has a limited storage-capacity size and its partition to a FIFO and LRU sections requires certain level of control. In other words, cache capacity is managed in accordance with a set of rules. The following rules for cache capacity management may be used:

If the FIFO region is full then the oldest files are evicted. Evicting files from the cache may require copying them first to tape;

If the LRU region is full then the files with the least number of access and the oldest last-access time are evicted. Evicting files from the cache may require copying them first to tape;

If the FIFO region is full and the LRU region has at least 50% free capacity then the FIFO region gains 30% of the LRU region capacity;

If the LRU region is full and the FIFO region has at least 50% free capacity then the FIFO region gains 30% of the LRU region capacity.

It is to be understood that the aforementioned percentages are design parameters and might change depending on the specific application and workload.

What is claimed is:

1. A method for reading files stored on a storage system, the method comprising:
   communicatively coupling one or more remote systems for reading files stored
      in a storage with a first set of files according to a predetermined data format and
      in a cache memory with a second set of files, the second set of files being a subset of the first set of files;
   receiving from one or more remote systems at least one read request for reading a sequence of files;
   determining, among the files of the sequence of files, whether one or more cached files are already stored in the cache memory and whether one or more remaining files are not already stored in the cache memory;
   creating, within the one or more remaining files, an order according to which the remaining files should be read on the storage system, given locations of the remaining files as stored on the storage system according to the predetermined data format; and
   reading the one or more remaining files on the storage system according to the order and storing the remaining files in the cache memory.

2. The method of claim 1, wherein the cache memory includes non-volatile memory.

3. The method of claim 2, wherein the non-volatile memory is an array of hard disk and/or solid state drives.

4. The method of claim 3, wherein the array of hard disk and/or solid state drives is organized into a single logical address space.

5. The method of claim 1, wherein the cache memory is a file-level cache memory.

6. The method of claim 2, wherein the cache memory is a file-level cache memory.

7. The method of claim 3, wherein the cache memory is a file-level cache memory.

8. The method of claim 4, wherein the cache memory is a file-level cache memory.

9. The method of claim 1, wherein the cache memory is a block-level cache memory.

10. The method of claim 2, wherein the cache memory is a block-level cache memory.

11. The method of claim 3, wherein the cache memory is a block-level cache memory.

12. The method of claim 4, wherein the cache memory is a block-level cache memory.

13. The method of claim 1, wherein the storage comprises at least one magnetic tape medium storing the first set of files according to Linear Tape File System data format, and wherein the locations of the remaining files as stored on the storage system is determined according to a starting block for each remaining file as part of metadata of the Linear Tape File System data format.

14. The method of claim 1, wherein the cache memory comprises a first region that is managed using a First In First Out policy management and a second region managed that is managed using a Least Recently Used policy management, the first second regions being adapted to store the second set of files according to a set of rules for cache capacity management.

15. The method of claim 14, wherein the set of rules comprises at least the following rules:
i) if the first region is full, then oldest files of the second set are copied to the storage and evicted from the first region;
ii) if the first region is full and the second region has free capacity, then the first region gains a given percentage of the free capacity of the second region;
iii) if the second region is full, then the files of the second set with a least number of access and an oldest last-access time are copied to the storage and evicted from the second region; and
iv) if the second region is full and the first region has free capacity, then the second region gains a given percentage of the free capacity of the first region.

16. A non-transitory computer readable storage medium for reading files stored on a storage system, the computer readable storage medium comprising instructions configured to perform
communicatively coupling one or more remote systems for reading files stored
in a storage with a first set of files according to a predetermined data format and
in a cache memory with a second set of files, the second set of files being a subset of the first set of files;
receiving from one or more remote systems at least one read request for reading a sequence of files;
determining, among the files of the sequence of files, whether one or more cached files are already stored in the cache memory and whether one or more remaining files are not already stored in the cache memory;
creating, within the one or more remaining files, an order according to which the remaining files should be read on the storage system, given locations of the remaining files as stored on the storage system according to the predetermined data format; and
reading the one or more remaining files on the storage system according to the order and storing the remaining files in the cache memory.

17. The non-transitory computer readable storage medium of claim 16, wherein the cache memory includes non-volatile memory.

18. The non-transitory computer readable storage medium of claim 17, wherein the non-volatile memory is an array of hard disk and/or solid state drives.

19. A storage system comprising:
a memory;
a processor communicatively coupled to the memory, where the processor is configured to perform
communicatively coupling one or more remote systems for reading files stored
in a storage with a first set of files according to a predetermined data format and
in a cache memory with a second set of files, the second set of files being a subset of the first set of files;
receiving from one or more remote systems at least one read request for reading a sequence of files;
determining, among the files of the sequence of files, whether one or more cached files are already stored in the cache memory and whether one or more remaining files are not already stored in the cache memory;
creating, within the one or more remaining files, an order according to which the remaining files should be read on the storage system, given locations of the remaining files as stored on the storage system according to the predetermined data format; and
reading the one or more remaining files on the storage system according to the order and storing the remaining files in the cache memory.

20. The system of claim 19, wherein the cache memory includes non-volatile memory.

* * * * *